US 11,483,097 B2

(12) United States Patent
Feng et al.

(10) Patent No.: US 11,483,097 B2
(45) Date of Patent: Oct. 25, 2022

(54) WIRELESS COMMUNICATION METHOD, NETWORK DEVICE, TERMINAL DEVICE, AND READABLE STORAGE MEDIUM

(71) Applicant: Huawei Technologies Co., Ltd., Shenzhen (CN)

(72) Inventors: Shulan Feng, Beijing (CN); Xingwei Zhang, Lund (SE); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 16/992,903

(22) Filed: Aug. 13, 2020

(65) Prior Publication Data

US 2020/0374042 A1 Nov. 26, 2020

Related U.S. Application Data

(63) Continuation of application No. PCT/CN2019/074879, filed on Feb. 12, 2019.

(30) Foreign Application Priority Data

Feb. 13, 2018 (CN) .......................... 201810150951.5

(51) Int. Cl.
*H04L 1/18* (2006.01)
*H04L 1/08* (2006.01)
*H04W 72/04* (2009.01)

(52) U.S. Cl.
CPC .............. *H04L 1/1812* (2013.01); *H04L 1/08* (2013.01); *H04W 72/0406* (2013.01)

(58) Field of Classification Search
CPC ... H04W 28/04; H04W 72/04; H04W 72/042; H04W 88/08; H04W 72/0406;
(Continued)

(56) References Cited

U.S. PATENT DOCUMENTS

2010/0322165 A1* 12/2010 Yoo ...................... H04L 1/0073
370/329
2012/0039200 A1 2/2012 Lee et al.
(Continued)

FOREIGN PATENT DOCUMENTS

CN 102960022 A 3/2013
CN 105900369 A * 8/2016 ........... H04L 5/0055
(Continued)

OTHER PUBLICATIONS

3GPP TSG-RAN WG1 Meeting AH 1801, Jan. 22-26, 2018, Vancouver, Canada, R1-1800876, Agenda item:7.3.3.2, Source: Qualcomm Incorporated, Title: DL/UL Scheduling, Processing Time and HARQ management. (Year: 2018).*

(Continued)

*Primary Examiner* — Peter G Solinsky
*Assistant Examiner* — Sanjay K Dewan
(74) *Attorney, Agent, or Firm* — Leydig, Voit & Mayer, Ltd.

(57) ABSTRACT

This application provides a wireless communication method, a network device, a terminal device, and a computer-readable storage medium. The method includes: sending, by a network device, a first PDSCH and a second PDSCH to a terminal device, where scheduling performed by the network device on the first PDSCH and the second PDSCH is out-of-HARQ order scheduling; determining, by the network device, whether transmission of the second PDSCH interrupts a processing performed by the terminal device on the first PDSCH; and if the network device determines that the transmission of the second PDSCH interrupts the processing performed by the terminal device on the first PDSCH, determining, by the network device, that data corresponding to the first PDSCH is not successfully received.

20 Claims, 4 Drawing Sheets

(58) Field of Classification Search
CPC ... H04L 5/0007; H04L 1/1812; H04L 1/1861;
H04L 1/1893; H04L 1/08
USPC .......................................................... 370/329
See application file for complete search history.

(56) References Cited

U.S. PATENT DOCUMENTS

| | | | |
|---|---|---|---|
| 2012/0287868 A1 | 11/2012 | Sambhwani et al. | |
| 2013/0028213 A1* | 1/2013 | Ko | H04L 1/1861 370/329 |
| 2013/0077543 A1* | 3/2013 | Kim | H04L 1/1822 370/281 |
| 2015/0341866 A1* | 11/2015 | Park | H04L 1/1812 455/522 |
| 2016/0227521 A1 | 8/2016 | Han et al. | |
| 2018/0278382 A1* | 9/2018 | Ji | H04L 1/1812 |
| 2019/0045533 A1* | 2/2019 | Chatterjee | H04W 72/0446 |
| 2020/0008216 A1* | 1/2020 | Iyer | H04W 72/04 |
| 2020/0053748 A1* | 2/2020 | Hosseini | H04W 72/1242 |
| 2021/0176776 A1* | 6/2021 | Choi | H04L 1/0023 |

FOREIGN PATENT DOCUMENTS

| | | |
|---|---|---|
| CN | 106817767 A | 6/2017 |
| CN | 105264960 B | 10/2019 |
| WO | 2017105494 A1 | 6/2017 |

OTHER PUBLICATIONS

3GPP TSG RAN WG1 Meeting Ad Hoc, Vancouver, Canada, Jan. 22-26, 2018, R1-1800036, Agenda Item: 7.3.3.2, Source: Huawei, HiSilicon, Title: Summary of remaining issues on HARQ management. (Year: 2018).*

"Summary of remaining issues on HARQ management," 3GPP TSG RAN WG1 Meeting Ad Hoc, Vancouver, Canada, R1-1800036, Total 13 pages, 3rd Generation Partnership Project, Valbonne, France (Jan. 22-26, 2018).

"DL/UL Scheduling, Processing Time and HARQ management," 3GPP TSG-RAN WG1 Meeting AH 1801, Vancouver, Canada, R1-1800876, pp. 1-6, 3rd Generation Partnership Project, Valbonne, France (Jan. 22-26, 2018).

* cited by examiner

WIRELESS COMMUNICATION METHOD, NETWORK DEVICE, TERMINAL DEVICE, AND READABLE STORAGE MEDIUM

CROSS-REFERENCE TO RELATED APPLICATIONS

This application is a continuation of International Application No. PCT/CN2019/074879, filed on Feb. 12, 2019, which claims priority to Chinese Patent Application No. 201810150951.5, filed on Feb. 13, 2018. The disclosures of the aforementioned applications are hereby incorporated by reference in their entireties.

TECHNICAL FIELD

This application relates to the communications field, and more specifically, to a wireless communication method, a network device, a terminal device, and a computer-readable storage medium.

BACKGROUND

In a wireless communications system, a network device (for example, a base station) and a terminal device usually use a hybrid automatic repeat request (HARQ) mechanism to improve communication reliability.

Out-of-HARQ order scheduling sometimes occurs in a process of communication between a network device and a terminal device. For example, the network device sequentially sends a first physical downlink shared channel (PDSCH) and a second PDSCH to the terminal device. If data on the second PDSCH is data corresponding to an emergency service, the network device may schedule the first PDSCH and the second PDSCH, so that the terminal device preferentially feeds back HARQ information of the second PDSCH. In this case, a manner of scheduling the first PDSCH and the second PDSCH is the out-of-HARQ order scheduling.

The network device can learn, based on a HARQ mechanism, whether the terminal device correctly receives data corresponding to a PDSCH. However, in an out-of-HARQ order scheduling scenario, only a receiving status of the data corresponding to the PDSCH is learned, and this is unfavorable for the network device to make a correct scheduling policy.

SUMMARY

This application provides a wireless communication method, a network device, a terminal device, and a computer-readable storage medium. This is favorable for a network device to make a correct scheduling policy in an out-of-HARQ order scheduling scenario.

According to a first aspect, a wireless communication method applied to a network device is provided, including: sending a first PDSCH and a second PDSCH to a terminal device, where a time for sending the first PDSCH is earlier than a time for sending the second PDSCH, and a time for receiving HARQ information corresponding to the first PDSCH is later than a time for receiving HARQ information corresponding to the second PDSCH; determining whether transmission of the second PDSCH interrupts a processing process performed by the terminal device on the first PDSCH; and when it is determined that the transmission of the second PDSCH interrupts the processing process performed by the terminal device on the first PDSCH, determining that first data corresponding to the first PDSCH is not successfully received.

According to the wireless communication method provided in this application, in an out-of-HARQ order scheduling scenario, a network device actively determines whether transmission of a second PDSCH interrupts a processing process performed on a first PDSCH that is transmitted first. This facilitates the network device making a correct scheduling policy.

In a possible implementation, the wireless communication method further includes: sending first retransmitted data to the terminal device, where the first retransmitted data is retransmitted data that is self-decodable.

When it is determined that the transmission of the second PDSCH interrupts the processing process performed by the terminal device on the first PDSCH, the transmitted data that is self-decodable is retransmitted to the terminal device, so that transmission reliability is improved.

In a possible implementation, the first retransmitted data is data that is the same as initial transmitted data corresponding to the first PDSCH.

In a possible implementation, the determining whether the transmission of the second PDSCH interrupts a processing process performed by the terminal device on the first PDSCH includes: determining, based on capability information of the terminal device, a transmission mode corresponding to the first PDSCH, and a transmission mode corresponding to the second PDSCH, whether the transmission of the second PDSCH interrupts the processing process performed by the terminal device on the first PDSCH, where the capability information of the terminal device includes at least one of the following information: a downlink data processing delay of the terminal device and a quantity of PDSCHs that can be processed by the terminal device at the same time.

In a possible implementation, before the determining, based on capability information of the terminal device, a transmission mode corresponding to the first PDSCH, and a transmission mode corresponding to the second PDSCH, whether the transmission of the second PDSCH interrupts the processing process performed by the terminal device on the first PDSCH, the wireless communication method further includes: receiving the capability information sent by the terminal device.

In a possible implementation, the determining, based on capability information of the terminal device, a transmission mode corresponding to the first PDSCH, and a transmission mode corresponding to the second PDSCH, whether the transmission of the second PDSCH interrupts the processing process performed by the terminal device on the first PDSCH includes: determining, based on the capability information of the terminal device, the transmission mode corresponding to the first PDSCH, and the transmission mode corresponding to the second PDSCH, a relationship between an end time for processing the first PDSCH and a latest start time for processing the second PDSCH; and when the end time for processing the first PDSCH is later than the latest start time for processing the second PDSCH, determining that the transmission of the second PDSCH interrupts the processing process performed on the first PDSCH.

In a possible implementation, the wireless communication method further includes: if the transmission of the second PDSCH does not interrupt the processing process performed by the terminal device on the first PDSCH, and the HARQ information corresponding to the first PDSCH is a NACK, sending, to the terminal device, second retransmitted data corresponding to the first PDSCH, where the second retransmitted data is incremental redundancy data corresponding to the first PDSCH.

According to the wireless communication method provided in this application, if determining that a first PDSCH is not interrupted, a network device may send data based on a normal retransmission procedure with reference to HARQ information of a terminal device.

In a possible implementation, the sending first retransmitted data corresponding to the first PDSCH to the terminal device includes: directly sending the first retransmitted data to the terminal device without reception of the HARQ information corresponding to the first PDSCH.

According to the wireless communication method provided in this application, a network device can choose, on a basis of actively determining that a first PDSCH is not correctly received, not to receive HARQ information corresponding to the first PDSCH, so that receiving resources can be reduced.

In a possible implementation, the sending first retransmitted data corresponding to the first PDSCH to the terminal device includes: sending the first retransmitted data to the terminal device at a target time, where the target time is not later than the time for receiving the HARQ information corresponding to the first PDSCH.

According to the wireless communication method provided in this application, a network device can choose, on a basis of actively determining that a first PDSCH is not correctly received, to send retransmitted data to a terminal device before HARQ information is received at a predefined time, so that transmission efficiency can be improved, and a transmission delay can be reduced.

In a possible implementation, the wireless communication method further includes: determining whether the second PDSCH is an emergency service; and when the second PDSCH is a non-emergency service, scheduling the latest start time for processing the second PDSCH to be later than the end time for processing the first PDSCH.

In a possible implementation, the wireless communication method further includes: determining the end time for processing the first PDSCH, and determining whether the second PDSCH is the emergency service; and when the second PDSCH is the non-emergency service, scheduling the latest start time for processing the second PDSCH to be later than the end time for processing the first PDSCH.

According to the wireless communication method provided in this application, if determining that a second PDSCH is a non-emergency service, a network device may actively determine a scheduling time of the second PDSCH, to avoid a case in which a terminal device interrupts a first PDSCH.

In a possible implementation, the wireless communication method further includes: discarding data corresponding to the first PDSCH, and re-scheduling the first PDSCH to the terminal device.

According to a second aspect, a wireless communication method applied to a terminal device is provided, including: receiving a first PDSCH and a second PDSCH from a network device, where a time for receiving the first PDSCH is earlier than a time for receiving the second PDSCH, and a time for sending HARQ information corresponding to the first PDSCH is later than a time for sending HARQ information corresponding to the second PDSCH; determining whether transmission of the second PDSCH interrupts a processing process performed by the network device on the first PDSCH; and when it is determined that the transmission of the second PDSCH interrupts the processing process performed by the network device on the first PDSCH, interrupting processing of first data corresponding to the first PDSCH.

According to the wireless communication method provided in this application, in an out-of-HARQ order scheduling scenario, a terminal device actively determines whether transmission of a second PDSCH interrupts a processing process performed on a first PDSCH that is transmitted first. This facilitates the terminal device making a correct scheduling policy.

In a possible implementation, the wireless communication method further includes: receiving first retransmitted data sent by the network device, where the first retransmitted data is retransmitted data that is self-decodable.

In a possible implementation, the first retransmitted data is data that is the same as an initial data packet corresponding to the first PDSCH.

In a possible implementation, the determining whether the transmission of the second PDSCH interrupts a processing process performed by the terminal device on the first PDSCH includes: determining, based on capability information of the terminal device, a transmission mode corresponding to the first PDSCH, and a transmission mode corresponding to the second PDSCH, whether the transmission of the second PDSCH interrupts the processing process performed on the first PDSCH, where the capability information of the terminal device includes at least one of the following information: a downlink data processing delay of the terminal device and a quantity of PDSCHs that can be processed by the terminal device at the same time.

In a possible implementation, the wireless communication method further includes: sending the capability information of the terminal device to the network device.

In a possible implementation, the determining, based on capability information of the terminal device, a transmission mode corresponding to the first PDSCH, and a transmission mode corresponding to the second PDSCH, whether the transmission of the second PDSCH interrupts the processing process performed on the first PDSCH includes: determining, based on the capability information of the terminal device, the transmission mode corresponding to the first PDSCH, and the transmission mode corresponding to the second PDSCH, a relationship between an end time for processing the first PDSCH and a latest start time for processing the second PDSCH; and when the end time for processing the first PDSCH is later than the latest start time for processing the second PDSCH, determining that the transmission of the second PDSCH interrupts the processing process performed on the first PDSCH.

In a possible implementation, the wireless communication method further includes: if the transmission of the second PDSCH does not interrupt the processing process performed on the first PDSCH, and the HARQ information corresponding to the first PDSCH is a NACK, receiving, from the network device, second retransmitted data corresponding to the first PDSCH, where the second retransmitted data is incremental redundancy data corresponding to the first PDSCH.

In a possible implementation, the wireless communication method further includes: if the transmission of the second PDSCH does not interrupt the processing process performed on the first PDSCH, determining that the HARQ information corresponding to the first PDSCH is not ACK information.

In a possible implementation, the wireless communication method further includes: if the transmission of the second PDSCH does not interrupt the processing process performed on the first PDSCH, determining that the HARQ information corresponding to the first PDSCH is not the ACK information, and sending the NACK information at the time for sending the HARQ information corresponding to the first PDSCH.

In a possible implementation, the wireless communication method further includes: if the transmission of the second PDSCH does not interrupt the processing process performed on the first PDSCH, determining that the HARQ information corresponding to the first PDSCH is not the ACK information, and skipping sending the HARQ information at the time for sending the HARQ information corresponding to the first PDSCH, so that transmission resources are reduced.

According to a third aspect, an apparatus is provided. The apparatus is a network device or a chip in a network device, and includes a processing unit and a transceiver unit that are configured to perform the method according to any one of the first aspect or the implementations of the first aspect. When the apparatus is a network device, the processing unit may be a processor, the transceiver unit may be a transceiver, and the transceiver includes a radio frequency circuit. Optionally, the network device further includes a storage unit, and the storage unit may be a memory. When the apparatus is a chip in a network device, the processing unit may be a processor, and the transceiver unit may be an input/output interface, a pin, a circuit, or the like on the chip. The processing unit may execute a computer-executable instruction stored in a storage unit. Optionally, the storage unit may be a storage unit (for example, a register or a cache) in the chip, or may be a storage unit (for example, a read-only memory (ROM)) that is outside the chip and that is inside the network device, or another type of static storage device (for example, a random access memory (RAM)) that may store static information and an instruction, or the like. The foregoing processor mentioned anywhere above may be a central processing unit (CPU), a microprocessor, or an application-specific integrated circuit (ASIC), or may be one or more integrated circuits configured to control program execution of the signal sending method in any possible implementation of the first aspect.

According to a fourth aspect, an apparatus is provided. The apparatus is a terminal device or a chip in a terminal device, and includes a processing unit and a transceiver unit that are configured to perform the method according to any one of the second aspect or the implementations of the second aspect. When the apparatus is a terminal device, the processing unit may be a processor, the transceiver unit may be a transceiver, and the transceiver includes a radio frequency circuit. Optionally, the terminal device further includes a storage unit, and the storage unit may be a memory. When the apparatus is a chip in a terminal device, the processing unit may be a processor, and the transceiver unit may be an input/output interface, a pin, a circuit, or the like on the chip. The processing unit may execute a computer-executable instruction stored in a storage unit. Optionally, the storage unit may be a storage unit (for example, a register or a cache) in the chip, or may be a storage unit (for example, a read-only memory (ROM)) that is outside the chip and that is inside the terminal device, or another type of static storage device (for example, a random access memory (RAM)) that may store static information and an instruction, or the like. The foregoing processor mentioned anywhere above may be a central processing unit (CPU), a microprocessor, or an application-specific integrated circuit (ASIC), or may be one or more integrated circuits configured to control program execution of the signal sending method in any possible implementation of the first aspect.

According to a fifth aspect, a network device is provided, and the network device includes a processor and a transceiver that are configured to perform the method in any one of the first aspect or the implementations of the first aspect.

According to a sixth aspect, a terminal device is provided, and the terminal device includes a processor and a transceiver that are configured to perform the method in any one of the second aspect or the implementations of the second aspect.

According to a seventh aspect, a computer-readable storage medium is provided. The computer-readable storage medium is configured to store a computer software instruction, and the computer-readable storage medium includes a program designed for performing the method in any one of the first aspect or the implementations of the first aspect.

According to an eighth aspect, a computer-readable storage medium is provided. The computer-readable storage medium is configured to store a computer software instruction, and the computer-readable storage medium includes a program designed for performing the method in any one of the second aspect or the implementations of the second aspect.

According to a ninth aspect, a computer program product is provided. The computer program product includes computer program code, and when the computer program code is run on a computer, the computer is enabled to perform the method in any one of the first aspect or the implementations of the first aspect.

According to a tenth aspect, a computer program product is provided. The computer program product includes computer program code, and when the computer program code is run on a computer, the computer is enabled to perform the method in any one of the second aspect or the implementations of the second aspect.

According to an eleventh aspect, a chip is provided, including a processor and a memory. The memory is configured to store a computer program. The processor is configured to invoke the computer program from the memory and run the computer program. The computer program is used to implement the methods in the foregoing aspects.

According to a twelfth aspect, a communications system is provided. The communications system includes the network device according to the third aspect or the fifth aspect and the terminal device according to the fourth aspect or the sixth aspect.

DESCRIPTION OF EMBODIMENTS

Figure 1:
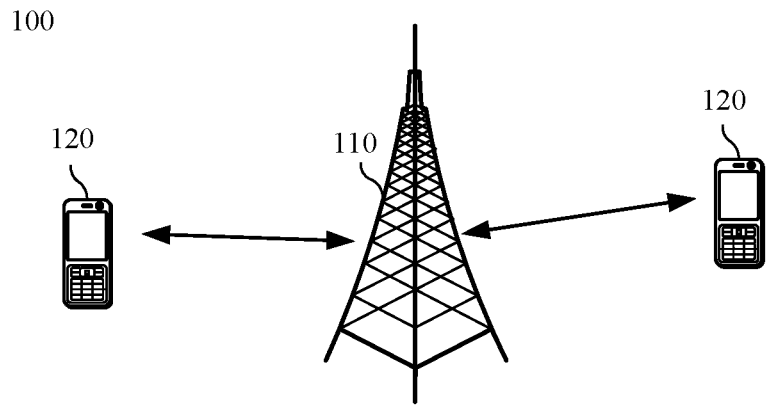
FIG. 1 shows a wireless communications system 100 to which an embodiment of this application is applied.

FIG. 1 is a wireless communications system 100 to which an embodiment of this application is applied. The wireless communications system 100 may include a network device 110. The network device 110 may be a device communicating with a terminal device 120. The network device 110 may provide communication coverage for a specific geographical area, and may communicate with the terminal device 120 located in the coverage area.

For example, FIG. 1 shows one network device and two terminals. Optionally, the wireless communications system 100 may include a plurality of network devices, and another quantity of terminals may be included in a coverage area of each network device. This is not limited in the embodiments of this application.

Optionally, the wireless communications system 100 may further include other network entities such as a network controller and a mobility management entity. This is not limited in the embodiments of this application.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

The terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with a terminal device. The network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in an LTE system, or may be a radio controller in a scenario of a cloud radio access network (CRAN). Alternatively, the network device may be a relay node, an access point, a vehicle-mounted device, a wearable device, a network device in a future 5G network, a network device in a future evolved PLMN network, or the like. This is not limited in the embodiments of this application.

The following describes a PDSCH scheduling process in detail by using a network device and a terminal device as an example.

A HARQ retransmission technology combines a forward error correction (FEC) and an automatic repeat request (ARQ), to improve communication reliability. When the network device sends a data packet to the terminal device, the data packet is sent to an antenna port for transmission after modulation and FEC coding are performed on the data packet at a physical layer. After arriving at the terminal device, the data packet is demodulated and decoded at a physical layer of the terminal device, and a decoding result is fed back to the transmit end. Usually, the network device determines, based on HARQ information fed back by the terminal device, whether the data packet is correctly received. If the terminal device can correctly receive the data packet, the terminal device sends acknowledgment (ACK) information to the network device. If the terminal device cannot correctly receive the data packet, the terminal device sends negative acknowledgment (NACK) information to the network device. After receiving the NACK sent by the terminal device, the network device resends the data packet.

Usually, the network device schedules the terminal device to receive a first PDSCH and a second PDSCH. For ease of description, the first PDSCH and the second PDSCH are referred to as D1 and D2 for short below. It is assumed that D1 is scheduled and transmitted before D2. In a normal case, a time for feeding back HARQ information of D2 is not earlier than a time for feeding back HARQ information of D1, and such scheduling is referred to as sequential scheduling. However, in some scenarios, for example, D2 is an emergency service. In this case, the network device may schedule the time for feeding back the HARQ information of D2 to be earlier than the time for feeding back the HARQ information of D1. A case in which later scheduled data is first fed back is referred to as out-of-HARQ order scheduling.

The network device can learn, based on a HARQ mechanism, whether the terminal device correctly receives data corresponding to a PDSCH. However, in an out-of-HARQ order scheduling scenario, only a receiving status of the data corresponding to the PDSCH is learned, and this is unfavorable for the network device to make a correct scheduling policy.

An embodiment of this application provides a wireless communication method. This is favorable for a network device to make a correct scheduling policy in an out-of-HARQ order scheduling scenario.

Figure 2:
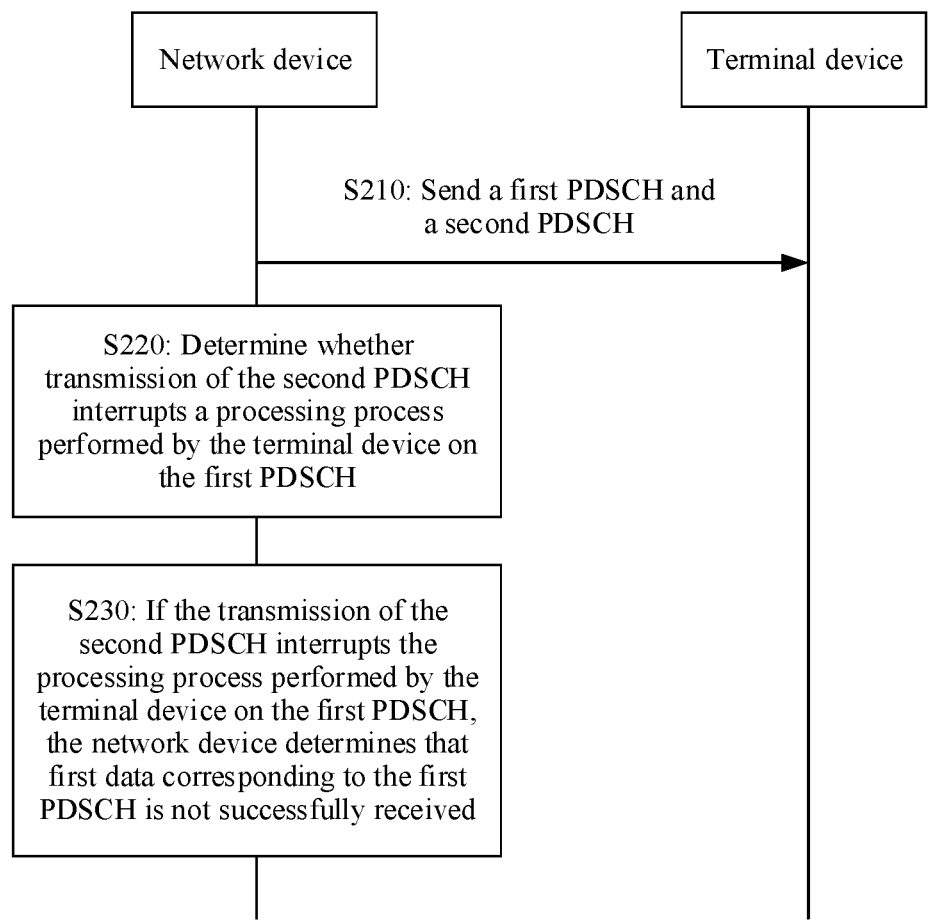
FIG. 2 is a schematic diagram of a wireless communication method according to an embodiment of this application.

FIG. 2 is a schematic flowchart of a wireless communication method according to an embodiment of this application. The method in FIG. 2 includes steps 210 to 230. The following separately describes steps 210 to 230 in detail.

In step 210, a network device sends a first PDSCH and a second PDSCH to a terminal device, where a time for sending the first PDSCH is earlier than a time for sending the second PDSCH, and a time for receiving HARQ information corresponding to the first PDSCH is later than a time for receiving HARQ information corresponding to the second PDSCH. In other words, scheduling performed by the network device on the first PDSCH and the second PDSCH is out-of-HARQ order scheduling.

The network device may have a radio resource scheduling function. For example, the network device may be a base station, a cell, or another type of network node and relay node that have a scheduling function, or the network device may be a relay terminal that has a scheduling function. In some embodiments, the network device may alternatively be a chip system.

In step 220, the network device determines whether transmission of the second PDSCH interrupts a processing process performed by the terminal device on the first PDSCH.

The processing process performed by the terminal device on the first PDSCH may include at least one of the following processes: a process of receiving data corresponding to the first PDSCH, a process of demodulating the first PDSCH, and a process of decoding the first PDSCH.

In step 230, if the network device determines that the transmission of the second PDSCH interrupts the processing process performed by the terminal device on the first PDSCH, the network device determines that first data corresponding to the first PDSCH is not successfully received.

According to the method provided in this embodiment of this application, in an out-of-HARQ order scheduling scenario, a network device actively determines whether transmission of a second PDSCH interrupts a processing process performed on a first PDSCH that is transmitted first. This is favorable for the network device to make a correct scheduling policy.

For ease of description, the first PDSCH and the second PDSCH are referred to as D1 and D2 for short below for description.

Usually, if the terminal device finds, in a process of processing data of D1, that data of more emergent D2 needs to be processed, the terminal device interrupts processing of D1, and then processes D2. Because the processing of D1 is interrupted, and the data of D1 may not be completely received, the terminal device feeds back, to the network device, that HARQ information of D1 is a NACK. The network device sends retransmitted data to the terminal device based on the NACK information fed back by the terminal device.

In this embodiment of this application, that the network device schedules D1 and D2 for the terminal device may be that the network device sends D1 and D2 to the terminal device at the same time, or may be that the network device sequentially sends D1 and D2 to the terminal device.

Incremental redundancy (IR) is a type of HARQ retransmission technology. In the IR technology, an information bit and some redundancy bits are sent during a first transmission, and additional redundancy bits are sent through retransmission. If decoding fails after the first transmission, a channel coding rate may be reduced by retransmitting more redundancy bits, to increase a decoding success rate. If the decoding still fails with the retransmitted redundancy bits, the retransmission is performed again. As a quantity of retransmissions increases, redundancy bits are continuously accumulated, and the channel coding rate is continuously reduced, so that a better decoding effect can be achieved. In most cases, a data packet transmitted for the first time is self-decodable. However, only a few redundancy bits may be included in a retransmitted data packet, and the retransmitted data packet is not self-decodable.

However, if the network device does not learn that the terminal device feeds back the NACK due to the interruption of D1, a retransmitted data packet sent by the network device may be a data packet that is not self-decodable. In this case, after receiving the retransmitted data packet, the terminal cannot correctly decode the retransmitted data packet, and continues to feed back a NACK, so that the network device continues to perform retransmission. This process continues until the quantity of retransmissions reaches a specific quantity of times, and higher layer data retransmission is started, or data is discarded. In an out-of-HARQ order scheduling scenario, the incremental redundancy retransmission technology causes a data loss, increases a data transmission delay, wastes transmission resources, and the like.

According to the wireless communication method provided in this embodiment of this application, after actively determining that D1 is not correctly received because D1 is interrupted, the network device may make some proper decisions based on the prediction. This can avoid unnecessary retransmission, reduce waste of transmission resources, and reduce a transmission delay.

Optionally, as an example, after determining that the terminal device interrupts D1, the network device may choose to discard transmitted data of D1, re-schedule D1, and send initial transmitted data of D1 to the terminal device.

Optionally, as an example, after determining that the terminal device interrupts D1, the network device sends first retransmitted data of D1 to the terminal device. The first retransmitted data is retransmitted data that is self-decodable. In this way, a problem that the transmission delay is increased and the waste of transmission resources is caused because the terminal device cannot correctly decode a data packet that is not self-decodable and continues to feed back a NACK can be avoided.

Optionally, as an example, after determining that the terminal device interrupts D1, the network device may choose not to receive the HARQ information of D1. In other words, the network device does not receive ACK/NACK feedback information of D1, directly performs processing based on that the HARQ information of D1 is a NACK, and sends first retransmitted data to the terminal device. In this way, resources for the network device to receive the HARQ of D1 can be saved, so that transmit power can be reduced.

That the network device does not receive the HARQ information of D1 may mean that the terminal device does not send the HARQ information within a predefined time, or the terminal device may send the HARQ information but the network device does not receive the HARQ information within a predefined time.

Optionally, as an example, after determining that the terminal device interrupts D1, the network device may choose to send first retransmitted data to the terminal device at a target time. The target time is not later than the time for receiving the HARQ information corresponding to D1. In other words, the network device sends the first retransmitted data to the terminal device in advance, so that the transmission delay can be reduced.

Optionally, as an example, after determining that the first data corresponding to D1 is not successfully received, the network device sends first retransmitted data to the terminal device. The first retransmitted data is retransmitted data that is self-decodable. As an example, the first retransmitted data is data that is the same as initial transmitted data corresponding to D1.

Further, the network device may determine whether currently scheduled data is the initial transmitted data corresponding to D1. If the data is the initial transmitted data, the network device sends, to the terminal device, the retransmitted data that is self-decodable. If the data is not the initial transmitted data, in other words, if the currently scheduled data is a retransmitted data packet, the network device may send the first retransmitted data to the terminal device, or may perform re-scheduling according to a normal retransmission procedure, to send retransmitted data (for example, incremental redundancy data) to the terminal device.

A manner of determining, by the network device, whether the transmission of D2 interrupts the processing process performed by the terminal device on D1 is not specifically limited in this embodiment of this application. As an example, the network device determines, based on capability information of the terminal device, a transmission mode corresponding to D1, and a transmission mode corresponding to D2, whether the transmission of D2 interrupts the processing process performed by the terminal device on D1.

Optionally, the transmission mode corresponding to D1 includes an end location of D1, an end location of a last demodulation reference signal (DMRS) of D1, a start location of transmission of the HARQ information corresponding to D1, and a subcarrier spacing of D1. The transmission mode corresponding to D2 includes an end location of D2, an end location of a last DMRS of D2, a start location of transmission of the HARQ information corresponding to D2, and a subcarrier spacing of D2.

A manner of obtaining the capability information is not specifically limited in this embodiment of this application. As an example, the capability information may be obtained by the network device according to a protocol specification. As another example, the capability information may be capability information reported by the terminal device to the network device.

In this embodiment of this application, the capability information may include at least one of the following information: a downlink data processing delay of the terminal device and a quantity of PDSCHs that can be processed by the terminal device at the same time.

The downlink data processing delay of the terminal device is a time interval starting from a time at which the terminal device ends receiving a last orthogonal frequency division multiplexing (OFDM) technology symbol of a PDSCH to an earliest possible start time at which HARQ information corresponding to the PDSCH is sent. The HARQ information includes ACK/NACK information fed back by the terminal device. Generally, a time interval starting from a time at which the terminal device ends receiving a last OFDM symbol of a PDSCH to a start time at which the terminal device sends an ACK/NACK signal is greater than or equal to the downlink data processing delay of the terminal device.

The downlink data processing delay of the terminal device includes processing delays of the terminal device in different scheduling conditions. The scheduling conditions include at least one of the following conditions: a subcarrier spacing of a PDSCH; a DMRS of the PDSCH, for example, the PDSCH includes only a front-loaded demodulation reference signal, or the PDSCH further includes an additional reference signal in addition to a front-loaded demodulation reference signal; whether transmitted data is initial transmitted data or retransmitted data; a type of the PDSCH, for example, the type of the PDSCH may be a type A or a type B, where a time domain length of a PDSCH of the type A is greater than or equal to seven OFDM symbols, and a time-domain length of a PDSCH of the type B is less than seven OFDM symbols; and a resource mapping manner of the PDSCH, for example, the resource mapping manner of the PDSCH is a manner of mapping first in the time domain and then in the frequency domain, or a manner of mapping first in the frequency domain and then in the time domain.

A subcarrier spacing and a DMRS of the PDSCH are used as an example to describe downlink data processing delays in different scheduling conditions.

If an OFDM symbol is used to represent a downlink data processing delay, the downlink data processing delay may be represented as N1 OFDM symbols, where N1 is a positive integer (N1: a time interval starting from a time at which the terminal device ends receiving an NR-PDSCH to an earliest possible start time at which the terminal device transmits a corresponding ACK/NACK is defined as a quantity of OFDM symbols required by the terminal device for processing). The following Table 1 shows downlink data processing delays in different scheduling conditions.

TABLE 1

| Scheduling condition | HARQ time parameter | Unit | 15 kHz Subcarrier | 30 kHz Subcarrier | 60 kHz Subcarrier | 120 kHz Subcarrier |
| --- | --- | --- | --- | --- | --- | --- |
| Only front-loaded demodulation reference signal | N1 | Symbol | 8 | 10 | 17 | 20 |
| Front-loaded demodulation reference signal + additional reference signal | N1 | Symbol | 13 | 13 | 20 | 24 |

A transmission time of an ACK/NACK that is corresponding to the PDSCH and that is to be scheduled by the network device needs to be greater than or equal to (N1+TA) symbols. TA represents a timing advance, and may represent, for example, an uplink timing advance of the terminal device relative to downlink transmission. TA may be measured in unit of symbol, absolute time, or sampling rate. TA is measured in unit of symbol herein.

If the PDSCH is transmitted in an $N^{th}$ slot, a last OFDM symbol of the PDSCH is a symbol $X\_2$ in the $N^{th}$ slot, and the corresponding ACK/NACK is transmitted in a symbol $X\_3$ in an $(N+K1)^{th}$ slot, a value of $K1 \times L+(X\_3-TA)-X\_2$ is greater than or equal to N1. L represents a quantity of symbols in one slot, for example, L=14 or L=7.

The quantity of PDSCHs that can be processed by the terminal device at the same time may be a quantity of PDSCHs that can be processed by the terminal at the same time in different transmission conditions.

The quantity of PDSCHs that can be processed by the terminal device at the same time in different transmission conditions may include at least one of the following information: a quantity of PDSCHs that can be processed on each carrier at the same time, a quantity of PDSCHs that can be processed on each frequency band at the same time, a quantity of PDSCHs that can be processed at a high frequency or a low frequency at the same time, a total quantity of PDSCHs that can be processed by the terminal device at the same time, and a quantity of PDSCHs of different sizes that can be processed by the terminal device at the same time. For example, for a data packet greater than 100 k, the terminal device can process one PDSCH at the same time;

and for a data packet less than or equal to 100 k, the terminal device can process two PDSCHs at the same time.

In this embodiment of this application, for example, the PDSCH may be a unicast PDSCH, a multicast PDSCH, or a broadcast PDSCH. For example, the quantity of PDSCHs that can be processed by the terminal device at the same time may be a quantity of unicast PDSCHs that can be processed on each carrier at the same time, or a quantity of unicast or broadcast PDSCHs that can be processed on each carrier at the same time. This is not specifically limited in this application.

A manner of determining, by the network device, whether the transmission of D2 interrupts the processing process performed by the terminal device on D1 is not specifically limited in this embodiment of this application. As an example, the network device may determine, based on a symbol difference between a time for feeding back D2 and a time for feeding back D1, whether the transmission of D2 interrupts the processing process performed by the terminal device on D1. As another example, whether the transmission of D2 interrupts the processing process performed by the terminal device on D1 may be determined based on whether a latest start time for processing D2 is earlier than an end time for processing D1. In other words, whether the transmission of D2 interrupts the processing process performed by the terminal device on D1 may be determined based on whether a time for processing D1 is later than an earliest start time for processing D2. If the quantity of unicast PDSCHs that can be processed by the terminal device on each carrier at the same time is limited, for example, the quantity is 1, and if the latest start time for processing D2 is earlier than the end time for processing D1, the network device may determine that a feedback signal from the terminal device is not an ACK.

A manner of determining whether the time for processing D1 is later than the earliest start time for processing D2 is not specifically limited in this embodiment of this application. As an example, whether the latest start time for processing D2 is later than the end time for processing D1 may be determined according to the following method.

A determining method is as follows. A first symbol of D1 is used as a symbol 0, and subsequent symbols are numbered sequentially.

(1) A last symbol that is of D1 and that carries the DMRS is a symbol $X1\_1$.

(2) A symbol of a last piece of data of D1 is a symbol $X1\_2$.

(3) A first symbol of the ACK/NACK corresponding to the transmission of D1 is a symbol $X1\_3$.

(4) A processing delay of D1 is a symbol $N1\_1$.

(5) The subcarrier spacing of D1 is $S\_1$.

(6) A last symbol that is of D2 and that carries the DMRS is a symbol $X2\_1$.

(7) A symbol of a last piece of data of D2 is a symbol $X2\_2$.

(8) A first symbol of the ACK/NACK corresponding to the transmission of D2 is a symbol $X2\_3$.

(9) A processing delay of D1 is a symbol $N1\_2$.

(10) The subcarrier spacing of D2 is $S\_2$.

(11) If $(X2\_3-TA-(X2\_2-X2\_1+N1\_2))/S\_2 > (X1\_1+(X1\_2-X1\_1+N1\_1))/S\_1$, it is considered that the latest start time for processing D2 is earlier than the end time for processing D1.

If the latest start time for processing D2 is earlier than the end time for processing D1, further, if D1 is the initial transmitted data, the network device resends, to the terminal device, the initial transmitted data or data that is self-decodable; or if D1 is the retransmitted data, the network device may send, to the terminal device, the initial transmitted data or data that is self-decodable, or may perform re-scheduling according to a normal retransmission procedure, to send incremental redundancy data.

Optionally, as an example, if the latest start time for processing D2 is later than the end time for processing D1, and the HARQ information corresponding to D1 is the NACK, the network device sends, to the terminal device, second retransmitted data corresponding to D1. The second retransmitted data is incremental redundancy data corresponding to D1.

Figure 3:
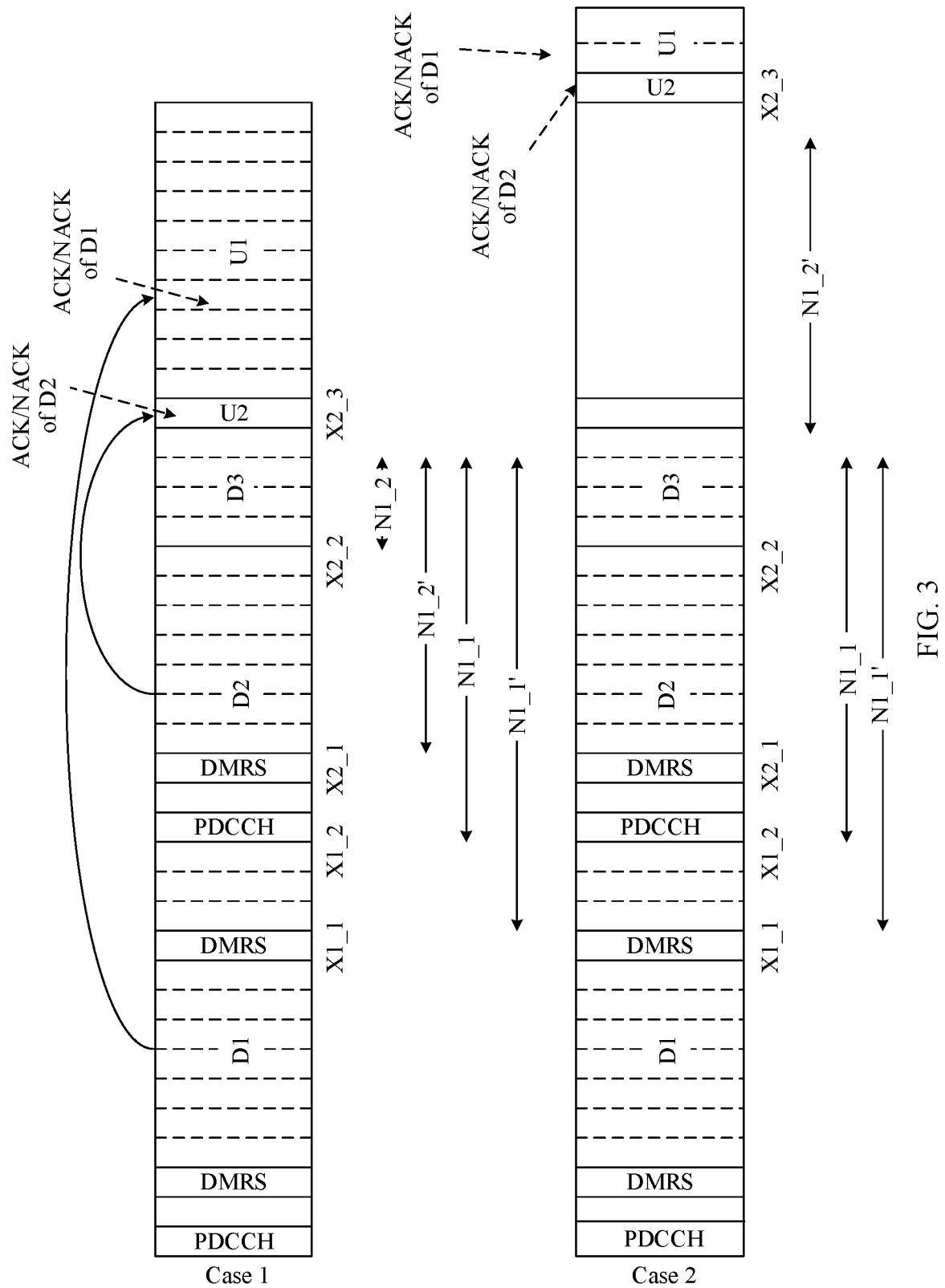
FIG. 3 is a schematic diagram of a manner in which a terminal device processes a PDSCH during out-of-HARQ order scheduling according to an embodiment of this application.

With reference to FIG. 3, the following specifically describes cases in which whether processing performed on D2 interrupts the processing process performed on D1. In FIG. 3, $N1=N1\_1+(X1\_2-X1\_1)$, and $N1\_2'=N1\_2+(X2\_2-X2\_1)$.

Case 1: The processing performed on D2 interrupts the processing process performed on D1. The latest start time for processing D2 is earlier than the end time for processing D1, that is, a time starting from the end time for processing D1 to a time at which D2 feeds back the ACK/NACK is less than a time required for processing D2. Therefore, the processing performed on D2 interrupts the processing process performed on D1.

Case 2: The processing performed on D2 does not interrupt the processing process performed on D1. The latest start time for processing D2 is later than the end time for processing D1, that is, a time starting from the end time for processing D1 to a time at which D2 feeds back the ACK/NACK is greater than a time required for processing D2. Therefore, the processing performed on D2 does not interrupt the processing process performed on D1.

Optionally, as an example, in a process of scheduling D1 and D2, the network device may take a measure to avoid the out-of-HARQ order scheduling.

Optionally, after determining that the processing performed by the terminal device on D2 interrupts the processing performed on D1, the network device may choose to notify the terminal device whether to discard D1 or D2. As an example, the network device may predetermine the capability information of the terminal device, and when a processing capability of the terminal device is limited, determine whether a priority of first scheduled D1 is higher or a priority of later scheduled D2 is higher. If the priority of first scheduled D1 is higher, the network device sends configuration information to the terminal device, to indicate the terminal device to preferentially process the data of D1 and to process the data of D2 only after the data of D1 has been processed.

Optionally, the network device may determine the transmission mode of D2 based on a capability of the terminal device. For example, the network device may reserve a sufficient time for the feedback of D2 to avoid an interruption scenario. For example, if the network device determines that D2 is a non-emergency service, the network device may determine the transmission mode of D2, so that the latest start time of D2 is later than the end time for processing D1. The network device may determine, according to the method described above, whether the time reserved for the feedback of D2 is sufficient. For example, $X2\_3 > X1\_1+(X1\_2-X1\_1+N1\_1)+TA+(X2\_2-X2\_1+N1\_2)$.

Optionally, the network device may determine, by using the following simplified condition, whether D2 interrupts D1.

(1) If a scheduling condition of D1 and a scheduling condition of D2 are the same, the network device may determine by default that D1 is not interrupted.

(2) If a scheduling time interval between D1 and D2 is very long, the network device may determine by default that D1 is not interrupted.

(3) If D1 and D2 are continuously scheduled, a scheduling condition changes, and a time for processing D1 is greater than a time for processing D2, the network device may determine by default that D1 is interrupted.

Figure 4:
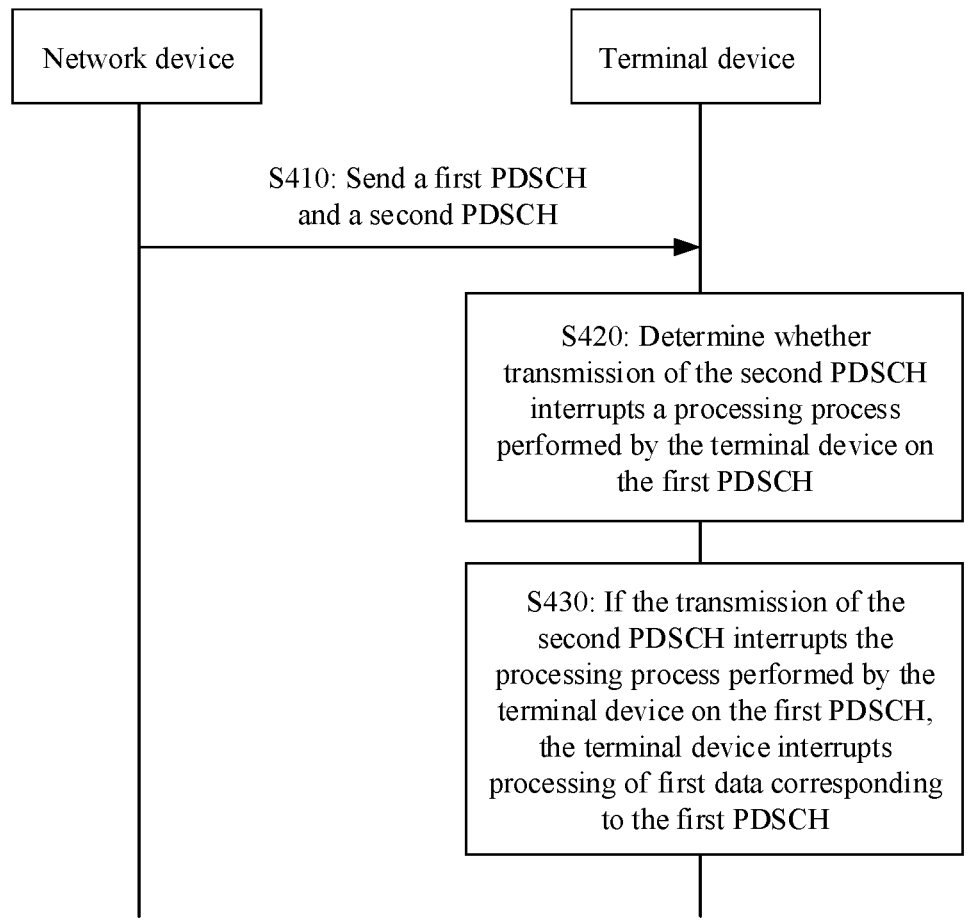
FIG. 4 is a schematic diagram of another wireless communication method according to an embodiment of this application.

FIG. 4 is a schematic flowchart of another wireless communication method according to an embodiment of this application. The method in FIG. 4 includes steps 410 to 430. The following separately describes steps 410 to 430 in detail.

In step 410, a terminal device receives a first PDSCH and a second PDSCH from a network device, where a time for receiving the first PDSCH is earlier than a time for receiving the second PDSCH, and a time for sending HARQ information corresponding to the first PDSCH is later than a time for sending HARQ information corresponding to the second PDSCH.

In step 420, the terminal device determines whether transmission of the second PDSCH interrupts a processing process performed by the terminal device on the first PDSCH.

In step 430, if the terminal device determines that the transmission of the second PDSCH interrupts the processing process performed by the terminal device on the first PDSCH, the terminal device interrupts processing of first data corresponding to the first PDSCH.

According to the wireless communication method provided in this application, in an out-of-HARQ order scheduling scenario, a terminal device actively determines whether transmission of a second PDSCH interrupts a processing process performed on a first PDSCH that is transmitted first. This facilitates the terminal device making a correct scheduling policy.

The network device actively determines, based on a scheduling manner of the first PDSCH and a scheduling manner of the second PDSCH, whether the transmission of the second PDSCH interrupts the processing process performed on the first PDSCH, to determine whether the first PDSCH is successfully received, so that a communication manner is more flexible.

Optionally, the terminal device may receive first retransmitted data or a new first PDSCH sent by the network device, where the first retransmitted data is retransmitted data that is self-decodable. The first retransmitted data may be data that is the same as initial transmitted data corresponding to the first PDSCH.

Optionally, after determining that the first PDSCH is interrupted, the terminal device may choose to discard the currently scheduled first PDSCH, to save resources. Then, operations such as demodulation and decoding are performed on the first retransmitted data sent by the network device.

Optionally, the terminal device may select, based on capability information of the terminal device, to store a state when the first PDSCH is interrupted after the first PDSCH is interrupted, and continue to perform the processing of the first PDSCH after processing performed on the second PDSCH is completed.

Optionally, after determining that the first PDSCH is interrupted, the terminal device may determine that the HARQ information corresponding to the first PDSCH is NACK information, and further transmit the NACK information on HARQ information transmission resources corresponding to the first PDSCH.

Optionally, after determining that the first PDSCH is interrupted, the terminal device may choose not to send an ACK/NACK signal corresponding to the first PDSCH, to save transmission resources.

A determining manner of determining, by the network device, whether the transmission of the second PDSCH interrupts the processing process performed by the terminal device on the first PDSCH is not specifically limited in this embodiment of this application. As an example, the terminal device determines, based on the capability information of the terminal device, a transmission mode corresponding to the first PDSCH, and a transmission mode corresponding to the second PDSCH, whether the transmission of the second PDSCH interrupts the processing process performed by the terminal device on the first PDSCH.

According to the wireless communication method provided in this embodiment of this application, when processing the first scheduled first PDSCH, the terminal device receives scheduling signaling of the later scheduled second PDSCH. If out-of-HARQ order scheduling occurs, the terminal device determines whether the terminal device interrupts processing performed on data of the first scheduled first PDSCH because the terminal device receives data of the later scheduled second PDSCH that needs to be fed back more urgently. If the terminal device determines that the terminal device interrupts the processing performed on the data of the first scheduled first PDSCH, the processing performed on D1 is interrupted. If the interrupt is not required, the data of D2 is buffered, and the processing performed on D2 is performed after the processing performed on the data of D1 is completed.

Optionally, the terminal device may also send the capability information of the terminal device to the network device.

Optionally, the transmission mode corresponding to the first PDSCH includes at least one of the following information: an end location of the first PDSCH, an end location of a last DMRS of the first PDSCH, a start location of transmission of the HARQ information corresponding to the first PDSCH, and a subcarrier spacing of the first PDSCH. The transmission mode corresponding to the second PDSCH includes at least one of the following information: an end location of the second PDSCH, an end location of a last DMRS of the second PDSCH, a start location of transmission of the HARQ information corresponding to the second PDSCH, and a subcarrier spacing of the second PDSCH.

In this embodiment of this application, the capability information may include at least one of the following information: a downlink data processing delay of the terminal device and a quantity of PDSCHs that can be processed by the terminal device at the same time.

The downlink data processing delay of the terminal device refers to a time interval starting from a time at which the terminal device ends receiving a last OFDM symbol of a PDSCH to a generation time of HARQ information of the PDSCH. The HARQ information includes ACK/NACK information fed back by the terminal device. Generally, a time interval starting from a time at which the terminal device ends receiving a last OFDM symbol of a PDSCH to a time at which the terminal device sends the ACK/NACK signal needs to be greater than or equal to the downlink data processing delay of the terminal device.

The downlink data processing delay of the terminal device includes processing delays of the terminal device in different scheduling conditions. The scheduling condition includes at least one of the following conditions: a subcarrier spacing of a PDSCH; a DMRS of the PDSCH, for example, the PDSCH includes only a demodulation reference signal, or the PDSCH further includes an additional reference signal; whether transmitted data is initial transmitted data or retransmitted data; and a type of the PDSCH. For example, the type of the PDSCH may be a type A or a type B. A time domain length of a PDSCH that is the type A is greater than or equal to seven OFDM symbols, and a time domain length of a PDSCH that is the type B is less than seven OFDM symbols.

The subcarrier spacing and the DMRS of the PDSCH are used as an example to describe the downlink data processing delays in different scheduling conditions.

If an OFDM symbol is used to represent a downlink data processing delay, the downlink data processing delay may be represented as N1 OFDM symbols, where N1 is a positive integer. The following Table 1 shows the downlink data processing delays in different scheduling conditions.

A period of time starting from a time at which the terminal device ends receiving the PDSCH to a time at which the terminal device starts to transmit the ACK/NACK needs to be greater than or equal to (N1+TA) symbols. TA represents a timing advance, namely a timing advance. TA is m symbols, and m is a positive integer. TA is an uplink timing advance of a terminal device relative to downlink transmission.

If the PDSCH is transmitted in an $N^{th}$ slot, the last symbol of the PDSCH is $X\_2$, and the corresponding ACK/NACK is transmitted in a symbol $X\_3$ in an (N+K1) slot, a value of $K1 \times L+(X\_3-TA)-X\_2$ is greater than or equal to N1. L represents a quantity of symbols in one slot, and L is equal to 7, 14, or another value.

The quantity of PDSCHs that can be processed by the terminal device at the same time may be a quantity of PDSCHs that can be processed by the terminal at the same time in different transmission conditions.

The quantity of PDSCHs that can be processed by the terminal device at the same time in different transmission conditions includes at least one of the following information: a quantity of PDSCHs that can be processed on each carrier at the same time, a quantity of PDSCHs that can be processed on each frequency band at the same time, a quantity of PDSCHs that can be processed in a high frequency or a low frequency at the same time, a total quantity of PDSCHs that can be processed by the terminal device at the same time, and a quantity of PDSCHs of different sizes that can be processed by the terminal device at the same time. For example, for a data packet greater than 100 k, the terminal device can process one PDSCH at the same time; and for a data packet less than or equal to 100 k, the terminal device may process two PDSCHs at the same time.

In this embodiment of this application, for example, the PDSCH may be a unicast PDSCH, or a multicast PDSCH. This is not specifically limited in this application.

A manner of determining, by the network device, whether the transmission of the second PDSCH interrupts the processing process performed by the terminal device on the first PDSCH is not specifically limited in this embodiment of this application. As an example, whether the processing performed on the first PDSCH is interrupted may be determined by the terminal device based on a symbol difference between a time for feeding back the second PDSCH and a time for feeding back the first PDSCH. As another example, whether the processing performed on the first PDSCH is interrupted may be determined by the terminal device based on whether a latest start time for processing the second PDSCH is earlier than an end time for processing the first PDSCH. In other words, whether the processing performed on the first PDSCH is interrupted may be determined by the terminal device based on whether the end time for processing the first PDSCH is later than an earliest start time for processing the second PDSCH. If the latest start time for processing the second PDSCH is earlier than the end time for processing the first PDSCH, the terminal device may determine that the processing performed on the first PDSCH is interrupted. As another example, whether the processing performed on the first PDSCH is interrupted may be determined by the terminal device based on a PDSCH processing capability of the terminal device and whether the latest start time for processing the second PDSCH is earlier than the end time for processing the first PDSCH. If a quantity of unicast PDSCHs that can be processed by the terminal device at the same time is limited, for example, 1, and if the latest start time for processing the second PDSCH is earlier than the end time for processing the first PDSCH, the terminal device may determine that the processing performed on the first PDSCH is interrupted.

A manner of determining whether the end time for processing the first PDSCH is later than the earliest start time for processing the second PDSCH is not specifically limited in this embodiment of this application. As an example, whether the latest start time for processing the second PDSCH is later than the end time for processing the first PDSCH may be determined according to the following method. For ease of description, the first PDSCH and the second PDSCH are referred to as D1 and D2 for short below.

A determining method is as follows. A first symbol of D1 is used as a symbol 0, and subsequent symbols are numbered sequentially.

(1) A last symbol that is of D1 and that carries the DMRS is a symbol $X1\_1$.

(2) A symbol of a last piece of data of D1 is a symbol $X1\_2$.

(3) A first symbol of the ACK/NACK corresponding to the transmission of D1 is a symbol $X1\_3$.

(4) A processing delay of D1 is a symbol $N1\_1$.

(5) The subcarrier spacing of D1 is $S\_1$.

(6) A last symbol that is of D2 and that carries the DMRS is a symbol $X2\_1$.

(7) A symbol of a last piece of data of D2 is a symbol $X2\_2$.

(8) A first symbol of the ACK/NACK corresponding to the transmission of D2 is a symbol $X2\_3$.

(9) A processing delay of D2 is a symbol $N1\_2$.

(10) The subcarrier spacing of D2 is $S\_2$.

(11) If $(X2\_3-TA-(X2\_2-X2\_1+N1\_2))/S\_2 > (X1\_1+(X1\_2-X1\_1+N1\_1))/S\_1$, it is considered that the latest start time for processing D2 is earlier than the end time for processing D1.

In a conventional communication manner, a PDSCH is usually used to carry data information sent by a network device to a terminal device, and a physical downlink control channel (PDCCH) is used to carry control signaling sent by the network device to the terminal device. A physical uplink control channel (PUCCH) or a physical uplink shared channel (PUSCH) is used to carry an acknowledgment signal that is an ACK/NACK indicating whether data carried by a PDSCH is successfully received.

In this embodiment of this application, a network device (for example, a base station or a cell) determines a transmission mode of downlink data and resources carried in a feedback signal for the downlink data, and transmits the downlink data to a terminal device by using downlink control signaling. The transmission mode of the downlink data includes time-frequency resources, a modulation manner, a coding manner, a resource mapping manner, and the like of the downlink data. Bearer resources of the feedback signal for the downlink data include time-frequency resources of the feedback signal that is an ACK/NACK. The time-frequency resources of the ACK/NACK may be directly specified by the control signaling sent by the network device, or may be obtained based on a specific rule, or some resource information is specified by the control signaling, and some resource information is obtained based on a predefined rule. The terminal device first receives the downlink control signaling to obtain a transmission mode of a PDSCH that needs to be received by the terminal device, and then receives the corresponding PDSCH in the defined transmission mode. The terminal device decodes a data block or a transmission block (TB) carried on the PDSCH, generates, based on a decoding result, a corresponding ACK/NACK signal, and then transmits the corresponding ACK/NACK signal on the transmission resources of the ACK/NACK based on a determined transmission mode of the ACK/NACK. A time interval between the terminal device receiving the PDSCH and sending the ACK/NACK needs to be greater than or equal to a processing delay of the terminal device processing data of the PDSCH.

The foregoing describes the method embodiments of this application in detail with reference to FIG. 1 to FIG. 4. The following describes apparatus embodiments of this application in detail with reference to FIG. 5 to FIG. 8. It should be understood that the descriptions of the method embodiments are corresponding to descriptions of the apparatus embodiments. Therefore, for parts that are not described in detail, refer to the method embodiments above.

Figure 5:
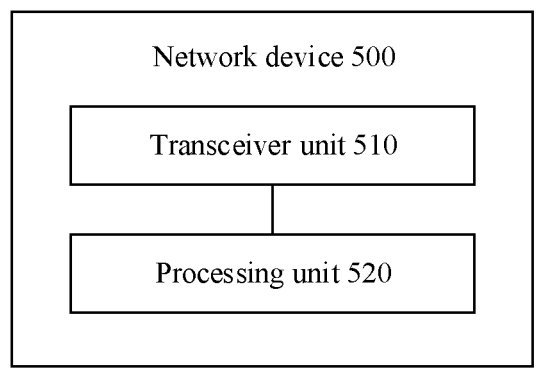
FIG. 5 is a schematic block diagram of a network device according to an embodiment of this application.

FIG. 5 is a schematic block diagram of a network device according to an embodiment of this application. The network device 500 includes a first sending unit 510, a first determining unit 520, and a second determining unit 530.

The transceiver unit 510 is configured to send a first PDSCH and a second PDSCH. A time for sending the first PDSCH is earlier than a time for sending the second PDSCH, and a time for receiving HARQ information corresponding to the first PDSCH is later than a time for receiving HARQ information of the second PDSCH.

The processing unit 520 is configured to determine whether the transmission of the second PDSCH interrupts a processing process performed by a terminal device on the first PDSCH.

The processing unit 520 is further configured to: when determining that the transmission of the second PDSCH interrupts the processing process performed by the terminal device on the first PDSCH, determine that first data corresponding to the first PDSCH is not successfully received.

According to the network device provided in this embodiment of this application, in an out-of-HARQ order scheduling scenario, a network device actively determines whether transmission of a second PDSCH interrupts a processing process performed on a first PDSCH that is transmitted first. This facilitates the network device making a correct scheduling policy.

Optionally, the network device further includes: the transceiver unit 510, further configured to send first retransmitted data to the terminal device, where the first retransmitted data is retransmitted data that is self-decodable. The first retransmitted data may be data that is the same as initial transmitted data corresponding to the first PDSCH.

Optionally, the processing unit 520 is further configured to determine, based on capability information of the terminal device, a transmission mode corresponding to the first PDSCH, and a transmission mode corresponding to the second PDSCH, whether the transmission of the second PDSCH interrupts the processing process performed by the terminal device on the first PDSCH. The capability information of the terminal device includes at least one of the following information: a downlink data processing delay of the terminal device and a quantity of PDSCHs that can be processed by the terminal device at the same time.

Optionally, the transceiver unit 510 is further configured to receive the capability information sent by the terminal device.

Optionally, the processing unit 520 is further configured to: determine, based on the capability information of the terminal device, the transmission mode corresponding to the first PDSCH, and the transmission mode corresponding to the second PDSCH, a relationship between an end time for processing the first PDSCH and a latest start time for processing the second PDSCH; and when the end time for processing the first PDSCH is later than the latest start time for processing the second PDSCH, determine that the transmission of the second PDSCH interrupts the processing process performed on the first PDSCH.

Optionally, the transmission mode corresponding to the first PDSCH includes at least one of the following information: an end location of the first PDSCH, an end location of a last demodulation reference signal of the first PDSCH, a start location of transmission of the HARQ information corresponding to the first PDSCH, and a subcarrier spacing of the first PDSCH. The transmission mode corresponding to the second PDSCH includes at least one of the following information: an end location of the second PDSCH, an end location of a last demodulation reference signal of the second PDSCH, a start location of transmission of the HARQ information corresponding to the second PDSCH, and a subcarrier spacing of the second PDSCH.

Optionally, the transceiver unit 510 is further configured to directly send the first retransmitted data to the terminal device without reception of the HARQ information corresponding to the first PDSCH.

Optionally, the transceiver unit 510 is further configured to send the first retransmitted data to the terminal device at a target time, where the target time is not later than the time for receiving the HARQ information corresponding to the first PDSCH.

Optionally, the processing unit 520 is further configured to determine the transmission mode of the second PDSCH based on a service type of the second PDSCH. When the service type of the second PDSCH is a non-emergency service, the processing unit 520 determines the transmission mode of the second PDSCH, to enable the latest start time for processing the second PDSCH to be later than the end time for processing the first PDSCH.

Figure 6:
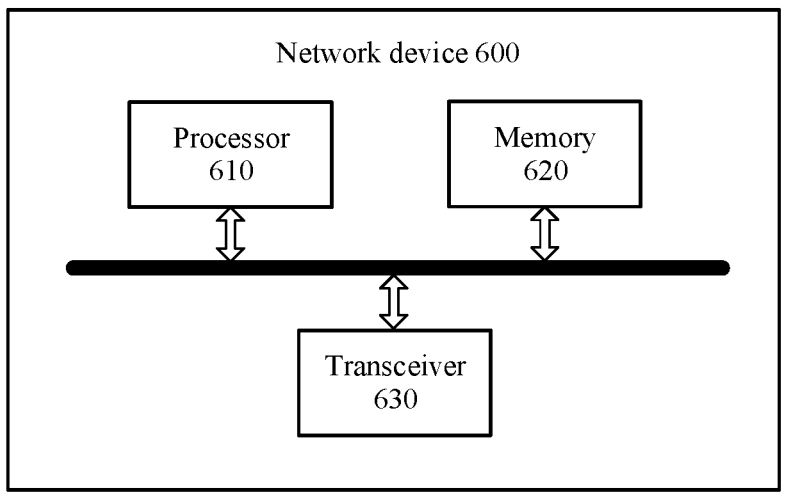
FIG. 6 is a schematic block diagram of another network device according to an embodiment of this application.

As shown in FIG. 6, a network device 600 is further provided according to an embodiment of this application. The network device 600 includes a processor 610, a memory 620, and a transceiver 630. The memory 620 is configured to store an instruction, and the processor 610 and the transceiver 630 are configured to execute the instruction stored in the memory 620.

It should be understood that the network device 500 shown in FIG. 5 or the network device 600 shown in FIG. 6 may be configured to perform a related operation or procedure in the method embodiments, and operations and/or functions of the units in the network device 500 or the network device 600 are separately used to implement corresponding procedures in the method embodiments. For brevity, details are not described herein again.

Figure 7:
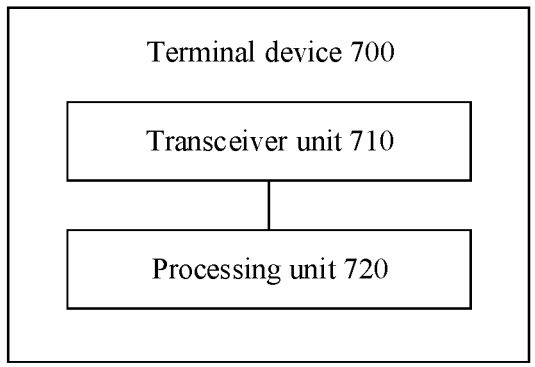
FIG. 7 is a schematic block diagram of a terminal device according to an embodiment of this application.

FIG. 7 is a schematic block diagram of a terminal device according to an embodiment of this application. The terminal device 700 includes a transceiver unit 710 and a processing unit 720.

The transceiver unit 710 is configured to receive a first PDSCH and a second PDSCH from a network device. A time for receiving the first PDSCH is earlier than a time for receiving the second PDSCH, and a time for sending HARQ information corresponding to the first PDSCH is later than a time for sending HARQ information corresponding to the second PDSCH.

The processing unit 720 is configured to determine whether the transmission of the second PDSCH interrupts a processing process performed by a terminal device on the first PDSCH.

The processing unit 720 is further configured to: when determining that the transmission of the second PDSCH interrupts the processing process performed by the terminal device on the first PDSCH, interrupt processing of first data corresponding to the first PDSCH According to the terminal device provided in this application, in an out-of-HARQ order scheduling scenario, a terminal device actively determines whether transmission of a second PDSCH interrupts a processing process performed on a first PDSCH that is transmitted first. This facilitates the terminal device making a correct scheduling policy.

Optionally, the transceiver unit 710 is further configured to receive first retransmitted data sent by the network device, where the first retransmitted data is retransmitted data that is self-decodable. The first retransmitted data may be data that is the same as initial transmitted data corresponding to the first PDSCH.

Optionally, the processing unit 720 is further configured to determine, based on capability information of the terminal device, a transmission mode corresponding to the first PDSCH, and a transmission mode corresponding to the second PDSCH, whether the transmission of the second PDSCH interrupts the processing process performed by the terminal device on the first PDSCH. The capability information of the terminal device includes at least one of the following information: a downlink data processing delay of the terminal device and a quantity of PDSCHs that can be processed by the terminal device at the same time.

Optionally, the transceiver unit 710 is further configured to send the capability information of the terminal device to the network device.

Optionally, the processing unit 720 is further configured to: determine, based on the capability information of the terminal device, the transmission mode corresponding to the first PDSCH, and the transmission mode corresponding to the second PDSCH, a relationship between an end time for processing the first PDSCH and a latest start time for processing the second PDSCH; and when the end time for processing the first PDSCH is later than the latest start time for processing the second PDSCH, determine that the transmission of the second PDSCH interrupts the processing process performed on the first PDSCH.

Optionally, the transmission mode corresponding to the first PDSCH includes at least one of the following information: an end location of the first PDSCH, an end location of a last demodulation reference signal of the first PDSCH, a start location of transmission of the HARQ information corresponding to the first PDSCH, and a subcarrier spacing of the first PDSCH. The transmission mode corresponding to the second PDSCH includes at least one of the following information: an end location of the second PDSCH, an end location of a last demodulation reference signal of the second PDSCH, a start location of transmission of the HARQ information corresponding to the second PDSCH, and a subcarrier spacing of the second PDSCH.

Figure 8:
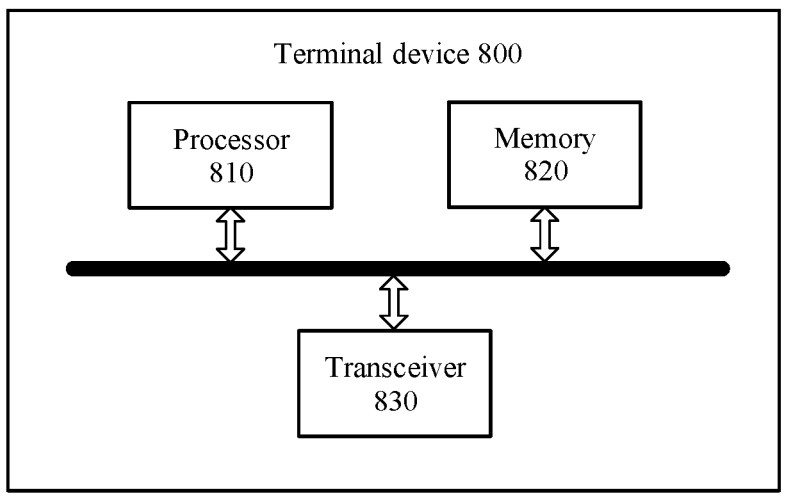
FIG. 8 is a schematic block diagram of another terminal device according to an embodiment of this application.

As shown in FIG. 8, a terminal device 800 is further provided according to an embodiment of this application. The terminal device 800 includes a processor 88, a memory 820, and a transceiver 830. The memory 820 is configured to store an instruction, and the processor 88 and the transceiver 830 are configured to execute the instruction stored in the memory 820.

It should be understood that the terminal device 700 shown in FIG. 7 or the terminal device 800 shown in FIG. 8 may be configured to perform a related operation or procedure in the method embodiments, and operations and/or functions of the units in the terminal device 700 or the terminal device 800 are separately used to implement corresponding procedures in the method embodiments. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
receiving, by a terminal device, a first physical downlink shared channel (PDSCH) and a second PDSCH from a network device, wherein a time for receiving the first PDSCH is earlier than a time for receiving the second PDSCH, and a time for sending hybrid automatic repeat request (HARQ) information corresponding to the first PDSCH is later than a time for sending HARQ information corresponding to the second PDSCH;
determining, by the terminal device, that transmission of the second PDSCH interrupts a processing performed by the terminal device on the first PDSCH; and
responsive to the terminal device determining that the transmission of the second PDSCH interrupts the processing performed by the terminal device on the first PDSCH, interrupting, by the terminal device, processing of first data corresponding to the first PDSCH.

2. The wireless communication method according to claim 1, wherein the wireless communication method further comprises:
receiving, by the terminal device, first retransmitted data sent by the network device, wherein the first retransmitted data is self-decodable.

3. The wireless communication method according to claim 2, wherein the first retransmitted data is the same as the first data corresponding to the first PDSCH.

4. The wireless communication method according to claim 1, wherein the determining, by the terminal device, that the transmission of the second PDSCH interrupts the processing performed by the terminal device on the first PDSCH comprises:
determining, by the terminal device based on capability information of the terminal device, a transmission mode corresponding to the first PDSCH, and a transmission mode corresponding to the second PDSCH, that the transmission of the second PDSCH interrupts the processing performed by the terminal device on the first PDSCH, wherein the capability information of the terminal device comprises at least one of the following information: a downlink data processing delay of the terminal device or a quantity of PDSCHs that can be processed by the terminal device at the same time.

5. The wireless communication method according to claim 4, wherein the wireless communication method further comprises:
sending, by the terminal device, the capability information of the terminal device to the network device.

6. The wireless communication method according to claim 4, wherein the determining, by the terminal device based on the capability information of the terminal device, the transmission mode corresponding to the first PDSCH, and the transmission mode corresponding to the second PDSCH, that the transmission of the second PDSCH interrupts the processing performed by the terminal device on the first PDSCH comprises:
determining, by the terminal device based on the capability information of the terminal device, the transmission mode corresponding to the first PDSCH, and the transmission mode corresponding to the second PDSCH, a relationship between an end time for processing the first PDSCH and a latest start time for processing the second PDSCH; and
responsive to determining that the end time for processing the first PDSCH is later than the latest start time for processing the second PDSCH, determining that the transmission of the second PDSCH interrupts the processing performed on the first PDSCH.

7. The wireless communication method according to claim 4, wherein:
the transmission mode corresponding to the first PDSCH comprises at least one of the following information: an end location of the first PDSCH, an end location of a last demodulation reference signal of the first PDSCH, a start location of transmission of the HARQ information corresponding to the first PDSCH, or a subcarrier spacing of the first PDSCH; and
the transmission mode corresponding to the second PDSCH comprises at least one of the following information: an end location of the second PDSCH, an end location of a last demodulation reference signal of the second PDSCH, a start location of transmission of the HARQ information corresponding to the second PDSCH, or a subcarrier spacing of the second PDSCH.

8. An apparatus, comprising:
a non-transitory memory storage comprising instructions; and
one or more processors in communication with the memory storage, wherein the instructions, when executed by the one or more processors, cause the apparatus to:
send a first physical downlink shared channel (PDSCH) and a second PDSCH, wherein a time for sending the first PDSCH is earlier than a time for sending the second PDSCH, and a time for receiving hybrid automatic repeat request (HARQ) information corresponding to the first PDSCH is later than a time for receiving HARQ information corresponding to the second PDSCH;
determine that transmission of the second PDSCH interrupts a processing performed by a terminal device on the first PDSCH; and
responsive to determining that the transmission of the second PDSCH interrupts the processing performed by the terminal device on the first PDSCH, determine that first data corresponding to the first PDSCH is not successfully received.

9. The apparatus according to claim 8, wherein the instructions, when executed by the one or more processors, further cause the apparatus to:
send first retransmitted data to the terminal device, wherein the first retransmitted data is self-decodable.

10. The apparatus according to claim 9, wherein the first retransmitted data is the same as initial transmitted data corresponding to the first PDSCH.

11. The apparatus according to claim 8, wherein the instructions, when executed by the one or more processors, further cause the apparatus to:
determine, based on capability information of the terminal device, a transmission mode corresponding to the first PDSCH, and a transmission mode corresponding to the second PDSCH, that the transmission of the second PDSCH interrupts the processing performed by the terminal device on the first PDSCH, wherein the capability information of the terminal device comprises at least one of the following information: a downlink data processing delay of the terminal device or a quantity of PDSCHs that can be processed by the terminal device at the same time.

12. The apparatus according to claim 11, wherein
the transmission mode corresponding to the first PDSCH comprises at least one of the following information: an end location of the first PDSCH, an end location of a last demodulation reference signal of the first PDSCH, a start location of transmission of the HARQ information corresponding to the first PDSCH, or a subcarrier spacing of the first PDSCH; and
the transmission mode corresponding to the second PDSCH comprises at least one of the following information: an end location of the second PDSCH, an end location of a last demodulation reference signal of the second PDSCH, a start location of transmission of the HARQ information corresponding to the second PDSCH, or a subcarrier spacing of the second PDSCH.

13. The apparatus according to claim 8, wherein the instructions, when executed by the one or more processors, further cause the apparatus to:
directly send the first retransmitted data to the terminal device without reception of the HARQ information corresponding to the first PDSCH.

14. An apparatus, comprising:
a non-transitory memory storage comprising instructions; and
one or more processors in communication with the memory storage, wherein the instructions, when executed by the one or more processors, cause the apparatus to:
receive a first physical downlink shared channel (PDSCH) and a second PDSCH from a network device, wherein a time for receiving the first PDSCH is earlier than a time for receiving the second PDSCH, and a time for sending hybrid automatic repeat request (HARQ) information corresponding to the first PDSCH is later than a time for sending HARQ information corresponding to the second PDSCH;
determine that transmission of the second PDSCH interrupts a processing performed by the terminal device on the first PDSCH; and
responsive to determining that the transmission of the second PDSCH interrupts the processing performed by the terminal device on the first PDSCH, interrupt processing of first data corresponding to the first PDSCH.

15. The apparatus according to claim 14, wherein the instructions, when executed by the one or more processors, further cause the apparatus to:
receive first retransmitted data sent by the network device, wherein the first retransmitted data is self-decodable.

16. The apparatus according to claim 15, wherein the first retransmitted data is the same as the first data corresponding to the first PDSCH.

17. The apparatus according to claim 14, wherein the instructions, when executed by the one or more processors, further cause the apparatus to:
determine, based on capability information of the terminal device, a transmission mode corresponding to the first PDSCH, and a transmission mode corresponding to the second PDSCH, that the transmission of the second PDSCH interrupts the processing process performed by the terminal device on the first PDSCH, wherein the capability information of the terminal device comprises at least one of the following information: a downlink data processing delay of the terminal device or a quantity of PDSCHs that can be processed by the terminal device at the same time.

18. The apparatus according to claim 17, wherein the instructions, when executed by the one or more processors, further cause the apparatus to:
send the capability information of the terminal device to the network device.

19. The apparatus according to claim 17, wherein the instructions, when executed by the one or more processors, further cause the apparatus to:
determine, based on the capability information of the terminal device, the transmission mode corresponding to the first PDSCH, and the transmission mode corresponding to the second PDSCH, a relationship between an end time for processing the first PDSCH and a latest start time for processing the second PDSCH; and
responsive to determining that the end time for processing the first PDSCH is later than the latest start time for processing the second PDSCH, determine the transmission of the second PDSCH interrupts the processing performed on the first PDSCH.

20. The apparatus according to claim 14, wherein
the transmission mode corresponding to the first PDSCH comprises at least one of the following information: an end location of the first PDSCH, an end location of a last demodulation reference signal of the first PDSCH, a start location of transmission of the HARQ information corresponding to the first PDSCH, or a subcarrier spacing of the first PDSCH; and
the transmission mode corresponding to the second PDSCH comprises at least one of the following information: an end location of the second PDSCH, an end location of a last demodulation reference signal of the second PDSCH, a start location of transmission of the HARQ information corresponding to the second PDSCH, or a subcarrier spacing of the second PDSCH.

* * * * *